(12) United States Patent
Wang et al.

(10) Patent No.: US 11,836,483 B1
(45) Date of Patent: Dec. 5, 2023

(54) COMPATIBLE AND SECURE SOFTWARE UPGRADES

(71) Applicant: INTERNATIONAL BUSINESS MACHINES CORPORATION, Armonk, NY (US)

(72) Inventors: Jun Wang, Xian (CN); Dong Hai Yu, Xian (CN); Bo Song, Xian (CN); Rui Wang, Xian (CN); Yao Dong Liu, Xian (CN); Jiang Bo Kang, Xian (CN)

(73) Assignee: International Business Machines Corporation, Armonk, NY (US)

(*) Notice: Subject to any disclaimer, the term of this patent is extended or adjusted under 35 U.S.C. 154(b) by 84 days.

(21) Appl. No.: 17/804,322

(22) Filed: May 27, 2022

(51) Int. Cl.
*H04L 9/08* (2006.01)
*G06F 9/445* (2018.01)
*G06N 20/00* (2019.01)
*G06F 9/455* (2018.01)
*G06F 8/71* (2018.01)

(52) U.S. Cl.
CPC .............. *G06F 8/71* (2013.01); *G06N 20/00* (2019.01)

(58) Field of Classification Search
CPC ........ G06F 8/71; G06F 18/40; G06F 18/2155; G06F 17/15; G06N 20/00; G06N 7/01; G16H 10/60; G16H 50/30; G16H 50/20
See application file for complete search history.

(56) References Cited

U.S. PATENT DOCUMENTS

| | | | |
|---|---|---|---|
| 10,713,594 B2 | 7/2020 | Szeto | |
| 2020/0202007 A1 | 6/2020 | Nagaraja | |
| 2021/0083855 A1* | 3/2021 | Polleri | .................... H04L 9/088 |

FOREIGN PATENT DOCUMENTS

| | | |
|---|---|---|
| CN | 113157314 A | 7/2021 |
| JP | 2018521430 A | 8/2018 |

OTHER PUBLICATIONS

"Introduction to Model IO", XGBoost Tutorials, Download Mar. 30, 2022, 16 Pgs.,<https://xgboost.readthedocs.io/en/latest/tutorials/saving_model.html>.
Kaewsanmua., "Best 8 Machine Learning Model Deployment Tools That You Need to Know"Neptune Blog,, 10 Pgs., Aug. 25, 2021, <https://neptune.ai/blog/best-8-machine-learning-model-deployment-tools>.
Mell et al., "The NIST Definition of Cloud Computing", National Institute of Standards and Technology, Special Publication 800-145, Sep. 2011, 7 pages.

(Continued)

*Primary Examiner* — Thuy Dao
(74) *Attorney, Agent, or Firm* — Stosch Sabo

(57) ABSTRACT

Described are techniques for machine learning library management. The techniques include generating a table including a plurality of machine learning libraries and their current versions that are used in a deployed machine learning platform (MLP) instance, a first available version upgrade for a first machine learning library of the plurality of machine learning libraries, a security indication associated with the first available version upgrade relative to a current version implemented by the first machine learning library, and a compatibility indication between the first available version upgrade and the current version of the first machine learning library. The techniques further include generating a recommendation related to upgrading the first machine learning library based on the security indication and the compatibility indication.

20 Claims, 8 Drawing Sheets

(56) References Cited

OTHER PUBLICATIONS

Podjarny., "Mitigating Known Security Risks In Open Source Libraries", O'Reilly, 13 Pgs., Jan. 30, 2018, <https://www.oreilly.com/content/mitigating-known-security-risks-in-open-source-libraries/>.

Seltzer., "How to Keep Up With Open Source Updates", Enterprise.nxt., 11 Pgs., Aug. 19, 2019, <https://www.hpe.com/us/en/insights/articles/how-to-keep-up-with-open-source-updates-1908.html>.

* cited by examiner

300 →

| IMAGE_V | LIB_NAME | LIB_V | MLP? | REL_DUR | ACTIVE |
|---|---|---|---|---|---|
| 2.0.10 | SCIKIT-LEARN | 0.23.2 | Y | 15 | 235 |
| 2.0.10 | PILLOW | 8.2.0 | N | 15 | 235 |
| 2.0.9 | SQLALCHEMY | 1.3.17 | N | 47 | 4567 |
| ... | ... | ... | ... | ... | ... |

| ISSUE_ID | IMAGE_V | LIB_NAME | LIB_V | FIX_V | SEV | MLP? | REL_DUR | ACTIVE |
|---|---|---|---|---|---|---|---|---|
| 1 | 2.0.10 | SCIKIT-LEARN | 0.23.2 | 0.24.2 | H | Y | 15 | 235 |
| 2 | 2.0.10 | PILLOW | 8.2.0 | 8.3.0 | M | N | 15 | 235 |
| 3 | 2.0.10 | SQLALCHEMY | 1.3.17 | 1.4.19 | L | N | 47 | 4567 |
| ... | ... | ... | ... | ... | ... | ... | ... | ... |

| ISSUE_ID | IMAGE_V | LIB_NAME | LIB_V | FIX_V | SEV | MLP? | REL_DUR | ACTIVE | BROKEN? |
|---|---|---|---|---|---|---|---|---|---|
| 1 | 2.0.10 | SCIKIT-LEARN | 0.23.2 | 0.24.2 | H | Y | 15 | 235 | Y |
| 2 | 2.0.10 | PILLOW | 8.2.0 | 8.3.0 | M | N | 15 | 235 | N |
| 3 | 2.0.10 | SQLALCHEMY | 1.3.17 | 1.4.19 | L | N | 47 | 4567 | N |
| ... | ... | ... | ... | ... | ... | ... | ... | ... | ... |

FIG. 3C

COMPATIBLE AND SECURE SOFTWARE UPGRADES

BACKGROUND

The present disclosure relates to software upgrades, and, more specifically, to automated techniques for managing compatibility and security issues in machine learning (ML) library version upgrades.

Software versioning relates to assigning unique identifiers to unique states of computer software. Within a given version number category (e.g., major or minor), these versioning numbers can be used to indicate new developments, features, functionalities, and/or security fixes in the software. Revision control can be used to track incrementally-different versions of a same software.

Software versioning can lead to incompatibilities. In other words, a new version of software may not be backward compatible with an old version of software. Such backward incompatibilities can lead to time-consuming recreations of programs and/or models created in an older version of software in order to be functional new version of software.

SUMMARY

Aspects of the present disclosure are directed toward a computer-implemented method comprising generating a table comprising a plurality of machine learning libraries and their current versions that are used in a deployed machine learning platform (MLP) instance, a first available version upgrade for a first machine learning library of the plurality of machine learning libraries, a security indication associated with the first available version upgrade relative to a current version implemented by the first machine learning library, and a compatibility indication between the first available version upgrade and the current version of the first machine learning library. The method further comprises generating a recommendation related to upgrading the first machine learning library based on the security indication and the compatibility indication.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 3A illustrates a table of library versions, in accordance with some embodiments of the present disclosure.

FIG. 3B illustrates a table of library versions including security upgrades and corresponding severities, in accordance with some embodiments of the present disclosure.

FIG. 3C illustrates a table of library versions including security upgrades, corresponding severities, and backward compatibilities, in accordance with some embodiments of the present disclosure.

Figure 1:
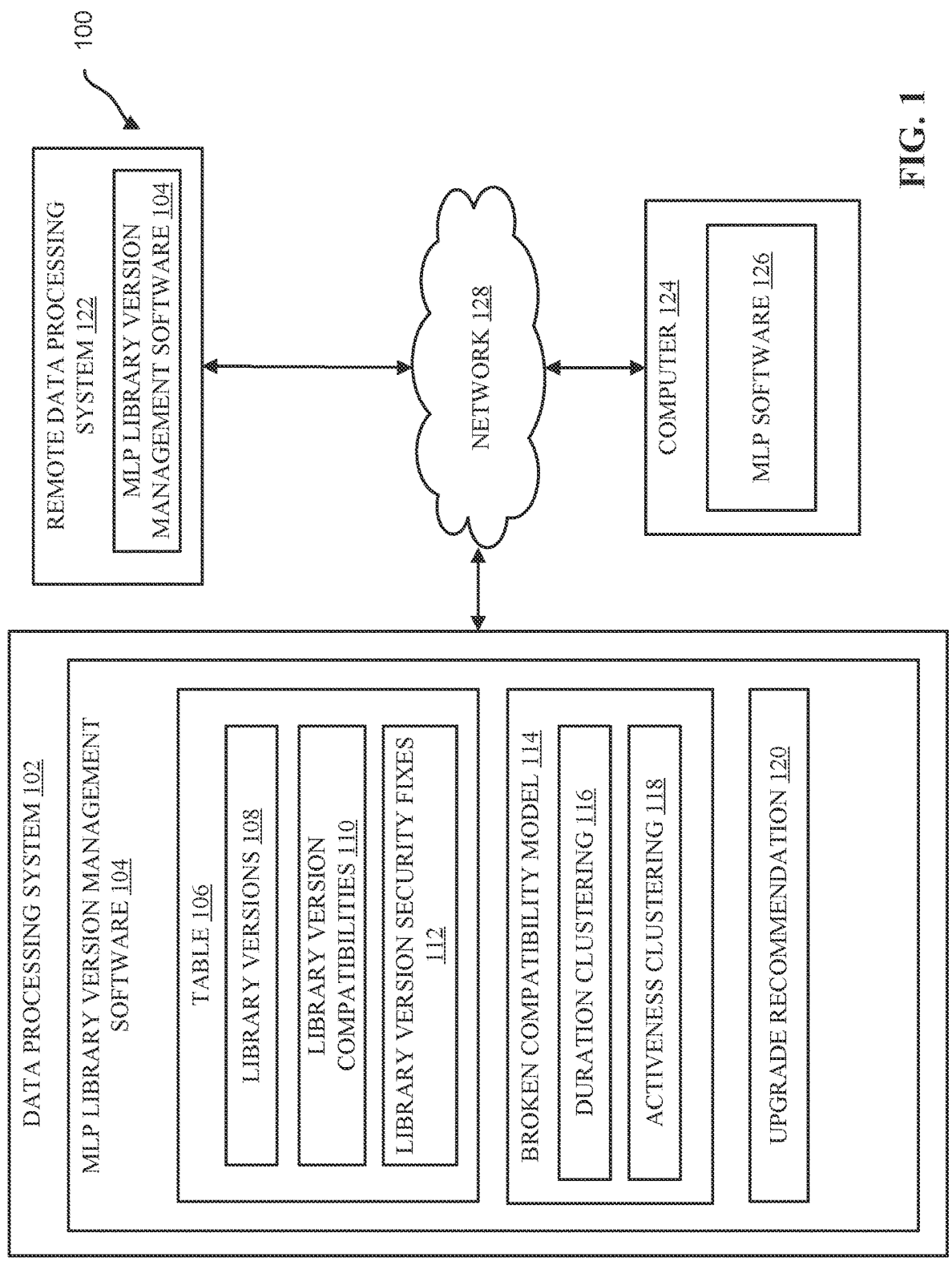
FIG. 1 illustrates a block diagram of an example computational environment implementing Machine Learning Platform (MLP) library version management software, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward software upgrades, and, more specifically, to automated techniques for managing compatibility and security issues in machine learning (ML) library version upgrades. While not limited to such applications, embodiments of the present disclosure may be better understood in light of the aforementioned context.

ML models can be built using open-source or proprietary Machine Learning Platforms (MLPs). Such ML models can utilize ML libraries. ML libraries (e.g., Pandas, Numpy, Matplotlib, OpenCV, Flask, Seaborn, etc.) can be an interface of a set of rules or optimized functions that are written in a given programming language to perform repetitive work like arithmetic computation, visualizing datasets, reading images, and the like. Thus, ML libraries are an efficient technique for developers to save time by reusing previously created and tested functions without needing to create or understand their underlying implementations.

However, version upgrades to MLPs and/or their associated ML libraries can lead to incompatibilities and broken ML models. For example, a ML model made with one version of ML library and/or MLP implemented on a production system using an incompatible version of the ML library and/or MLP will cause the ML model to fail. Nonetheless, there are cases where MLP and/or ML library versions should be upgraded even if they trigger an incompatibility event. Such a scenario typically involves security fixes, where the incompatible version upgrade fixes, patches, or otherwise resolves a security vulnerability. Given the large number of versions of MLPs and ML libraries, there is a need for automated techniques for safely meeting the often contradictory needs of compatibility and security in MLP and/or ML library version upgrades.

Aspects of the present disclosure address the aforementioned challenge. For example, aspects of the present disclosure can generate a table including a plurality of machine learning libraries and their current versions that are used in a deployed MLP instance. Aspects of the present disclosure can then modify the table to indicate available version upgrades for the plurality of machine learning libraries. Such a modified table can include (i) security indications associated with available version upgrades relative to current versions implemented by the machine learning libraries, and (ii) compatibility indications between the available version upgrades and the corresponding current versions of the machine learning libraries. Aspects of the present disclosure can then generate a recommendation related to upgrading the machine learning libraries based on the security indications and the compatibility indications.

Where the compatibility indication indicates that there is backward compatibility for a given available version upgrade, aspects of the present disclosure can implement the available version upgrades in an order according to the security indications (e.g., most severe to least severe).

Where the compatibility indication indicates that there are backward incompatibility issues for a given available version upgrade, aspects of the present disclosure can use a multi-level clustering model to automatically generate a customized recommendation. The multi-level clustering model can cluster the available version upgrades by a duration in a first level and by an activeness in a second level. Based on the various clustering combinations for various available version upgrades, aspects of the present disclosure can recommend to either (i) pursue a security exception (e.g., avoid upgrading), or (ii) initiate a deprecation process (e.g., implement the version upgrade and subsequently modify one or more ML models to be functional with the version upgrade).

As used herein, duration can mean various duration-related metrics such as, but not limited to, a length of time the current version of the ML library has been active, an average length of time between version upgrades for the given type of ML library, an estimated length of time between the available version upgrade and a next available version upgrade for the ML library, and/or any other duration-based metric.

As used herein, activeness can mean various usage-related metrics such as, but not limited to, a number of ML models utilizing a given ML library within an MLP instance, a number of endpoints implementing a given ML model associated with a given ML library, a number of outputs (e.g., predictions, classifications, etc.) from one or more ML models utilizing a given ML library, and/or any other usage-related metric.

Advantageously, aspects of the present disclosure improve efficiency of release management processes related to software upgrades, library upgrades, and/or other software-related version changes. In particular, aspects of the present disclosure automate the otherwise complicated process of determining software versioning ramifications for upgrades that may cause backward incompatibility but which may also reduce security vulnerabilities.

Although the present disclosure is primarily discussed with respect to deployed MLP instances and ML libraries, the techniques discussed herein can likewise be applied to any automated software versioning management system that may include software upgrades, firmware upgrades, driver upgrades, operating system (OS) upgrades, and the like.

Referring now to the figures, FIG. 1 illustrates a block diagram of an example computational environment 100 implementing MLP library version management software 104, in accordance with some embodiments of the present disclosure. The computational environment 100 includes a data processing system 102, remote data processing system 122, and computer 124 communicatively coupled to one another via a network 128. The network 128 can be a local area network (LAN), a wide area network (WAN), an intranet, the Internet, or any other network 128 or group of networks 128 capable of continuously, semi-continuously, or intermittently connecting (directly or indirectly) the aforementioned components together.

MLP library version management software 104 can be executed on the data processing system 102. In some embodiments, the MLP library version management software 104 is downloaded to the data processing system 102 from a remote data processing system 122. In other embodiments, some aspects of the MLP library version management software 104 are implemented by the data processing system 102 and other aspects of the MLP library version management software 104 are implemented by the remote data processing system 122.

MLP library version management software 104 can be configured to generate a table 106 storing library versions 108, library version compatibilities 110, and library version security fixes 112, among other data (e.g., duration, activeness, etc.). The MLP library version management software 104 can further implement a broken compatibility model 114. The broken compatibility model 114 can be configured to generate an upgrade recommendation 120 for cases where a version upgrade causes backward incompatibility. The broken compatibility model 114 can be a multi-level clustering model, where a first level implements duration clustering 116 and a second level implements activeness clustering 118. The broken compatibility model 114 can output the upgrade recommendation 120 based on clusters associated with a given version upgrade with backward incompatibility. The broken compatibility model 114 is discussed in more detail hereinafter with respect to FIG. 4.

Although the broken compatibility model 114 is generally described as a multi-level clustering model herein, in other embodiments, the broken compatibility model 114 can utilize any number of rules, algorithms, and/or techniques for generating upgrade recommendation 120 for a library version upgrade causing backward incompatibility. In some embodiments, the broken compatibility model 114 can include any number of machine learning algorithms such as, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, broken compatibility model 114 can be configured to perform machine learning using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multi-dimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques. After training the broken compatibility model 114, the broken compatibility model 114 can ingest information from table 106 and output upgrade recommendation 120 for library version upgrades causing backward incompatibility.

Referring back to the MLP library version management software 104, it can be configured to generate an upgrade recommendation 120 for one or more version upgrades of one or more ML libraries. For version upgrades that are backward compatible, the upgrade recommendation 120 can be to perform the version upgrade in an order based on the library version security fixes 112 (e.g., most severe security vulnerabilities upgraded first, least severe security vulnerabilities upgraded last). For version upgrades that are backward incompatible, the upgrade recommendation 120 can be based on an output of the broken compatibility model 114. The upgrade recommendation can be transmitted to and/or automatically implemented on a computer 124 executing MLP software 126. MLP software 126 can be, for example, Application Programming Interfaces (APIs) implementing previously built ML models using one or more ML libraries and deployed in an MLP instance to generate predictions, classifications, or other ML data analysis.

The data processing system 102, the remote data processing system 122, and the computer 124 can be any computer, server, mainframe, virtual machine (VM), tablet, notebook, smartphone, other computer hardware, multiples of the aforementioned, and/or combinations of the aforementioned. As will be appreciated by one skilled in the art, FIG. 1 is representative of some embodiments of the present disclosure but should not be construed as limiting. In other embodiments, more or fewer similar or dissimilar components than the components shown in FIG. 1 can be present. Furthermore, in various embodiments, the components shown in FIG. 1, if they are present at all, can be combined together into unified components or separated into discrete components.

Figure 2:
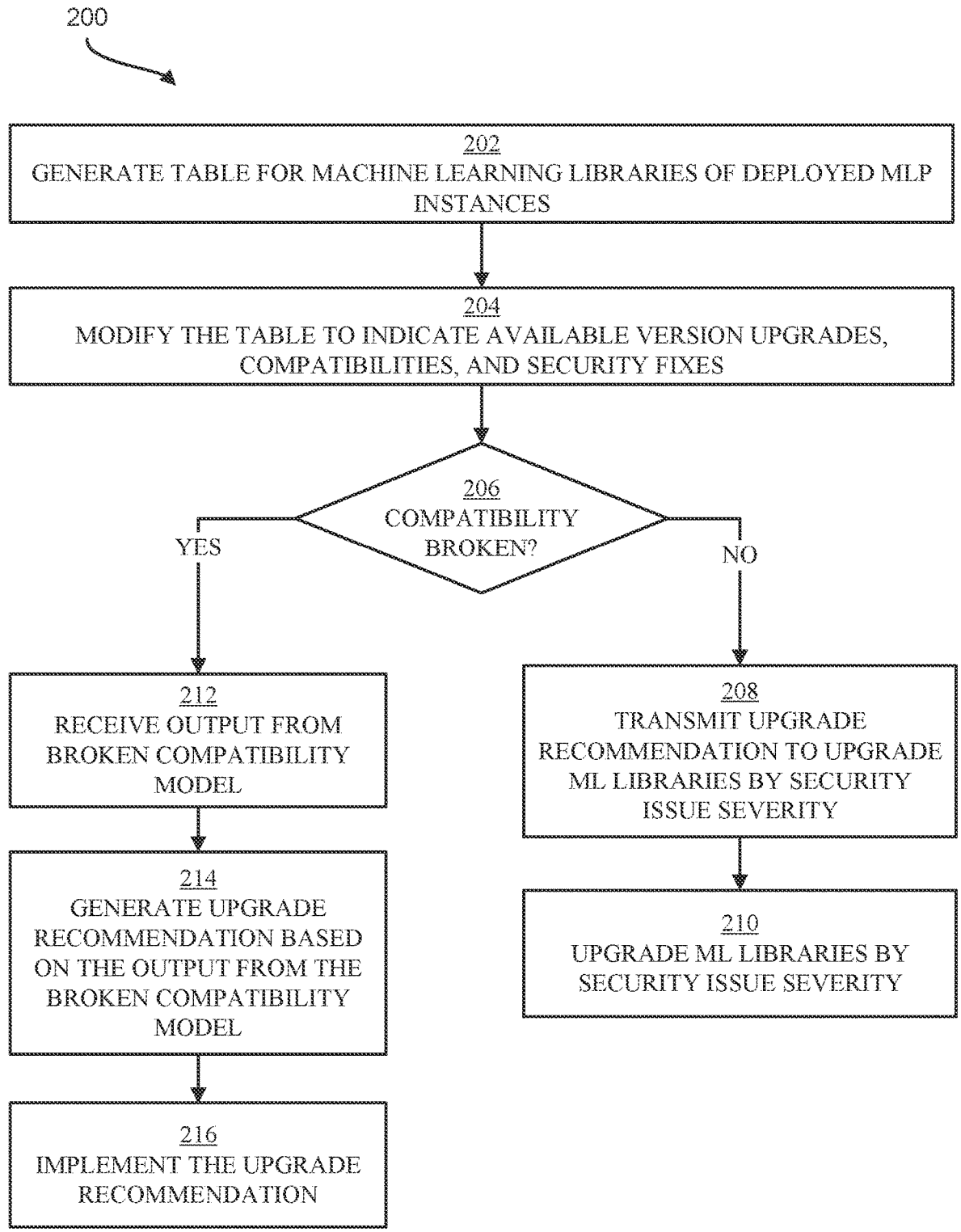
FIG. 2 illustrates a flowchart of an example method for MLP library version management, in accordance with some embodiments of the present disclosure.

FIG. 2 illustrates a flowchart of an example method 200 for MLP library version management, in accordance with some embodiments of the present disclosure. The method 200 can be implemented by a data processing system (e.g., data processing system 102 or remote data processing system 122 of FIG. 1), a computer, a processor, and/or another configuration of hardware and/or software.

Operation 202 includes generating a table for ML libraries of one or more deployed MLP instances. In some embodiments, operation 202 generates the table 106 of FIG. 1. The table generated in operation 202 is discussed in more detail with respect to FIG. 3A.

Operation 204 includes modifying the table to indicate available version upgrades, compatibilities, and/or security fixes. In some embodiments, operation 204 modifies the table to include library versions 108, library version compatibilities 110, and/or library version security fixes 112 of FIG. 1. The table generated in operation 204 is discussed in more detail hereinafter with respect to FIGS. 3B-3C.

In some embodiments, operations 202 and 204 occur together (e.g., upon implementing aspects of the present disclosure for a pre-existing MLP deployed instance). In other embodiments, operation 202 occurs upon initial deployment of a MLP instance and operation 204 intermittently occurs to update the table as new ML library versions become available and/or different ML libraries are added to the MLP deployed instance over time.

Operation 206 includes determining if there is backward incompatibility (e.g., broken compatibility) for any of the version upgrades. If not (206: NO), then the method 200 proceeds to operation 208 and transmits an upgrade recommendation (e.g., upgrade recommendation 120 of FIG. 1) indicating to upgrade one or more ML libraries to an updated version, where the one or more ML libraries can be updated in a sequence based on security issue severity. The method 200 can then proceed to operation 210 and implement the upgrade recommendation by upgrading the one or more ML libraries to the updated version, where the upgrading can occur in a sequence based on security issue severity.

Referring back to operation 206, if there is backward incompatibility (206: YES), then the method 200 can proceed to operation 212 and input the information related to the available version upgrades into a broken compatibility model (e.g., broken compatibility model 114 of FIG. 1). Operation 212 can include receiving output from the broken compatibility model. Operation 214 can include generating an upgrade recommendation (e.g., upgrade recommendation 120 of FIG. 1) based on the output from the broken compatibility model. Operation 216 can include implementing the upgrade recommendation.

FIG. 3A illustrates a table 300 of library versions, in accordance with some embodiments of the present disclosure. In some embodiments, the table 300 is generated by collecting all ML libraries associated with a deployed MLP instance. For example, table 300 can include an "image_v" column (referring to an MLP instance utilizing the associated ML library), a "lib_name" column specifying the ML library, a "lib_v" column specifying a version of the associated ML library, a "MLP?" column specifying whether or not the associated ML Library is used in the deployed MLP instance, a "rel_dur" column specifying a duration, and an "active" column specifying an activeness.

FIG. 3B illustrates a table 310 of library versions including security upgrades and corresponding severities, in accordance with some embodiments of the present disclosure. Table 310 includes the columns included in table 300 of FIG. 3A. However, table 310 is modified to include "fix_v" column indicating an available version upgrade for an associated ML library and a "sev" column indicating a security severity of the associated available version upgrade. The "sev" column can include any symbolic representation of severity such as numeric or alphanumeric. The "sev" column in table 310 includes variables such as H (high severity, critical, etc.), M (medium severity, urgent, etc.), and L (low severity, optional, etc.). In some embodiments, the "fix_v" and "sev" columns can be automatically populated with data by performing natural language processing (NLP) scans of software versioning documentation. Table 310 also includes an "issue_ID" column to use as an identifier for each ML library having an available version upgrade.

FIG. 3C illustrates a table 320 of library versions including security upgrades, corresponding severities, and backward compatibilities, in accordance with some embodiments of the present disclosure. Table 320 includes the columns included in table 310 of FIG. 3B. However, table 320 is modified to include a "BROKEN?" column indicating whether the available version upgrade maintains backward compatibility (e.g., N, no broken compatibility) or does not maintain backward compatibility or is otherwise backward incompatible (e.g., Y, broken compatibility). In some embodiments, the "BROKEN?" column of table 320 can be automatically populated by (i) fetching source code based on the "image_v" column for every ML library utilized in a given MLP instance (e.g., MLP?=Y), and identifying model-based prediction APIs related to the ML library; (ii) determining changes between current version and the available version upgrade using, for example, Natural Language Processing (NLP) techniques on software versioning documentation; and (iii) if any ML library component of a model-based prediction API is indicated as changed in step (ii), labeling the associated ML library as Y (e.g., broken compatibility, backward incompatible, etc.), otherwise labeling N (e.g., no broken compatibility, backward compatible).

The tables 300, 310, and 320 shown in FIGS. 3A-3C are example tables and should not be construed as limiting. Similar or dissimilar tables can be utilized in other embodiments. In some embodiments, any of the tables 300, 310, or 320 can be consistent with table 106 of FIG. 1. Furthermore, in some embodiments, no tables are utilized at all, but the information contained in tables 300, 310, or 320 is otherwise stored and utilized in another type of data (e.g., vector, tensor, array, etc.).

Figure 4:
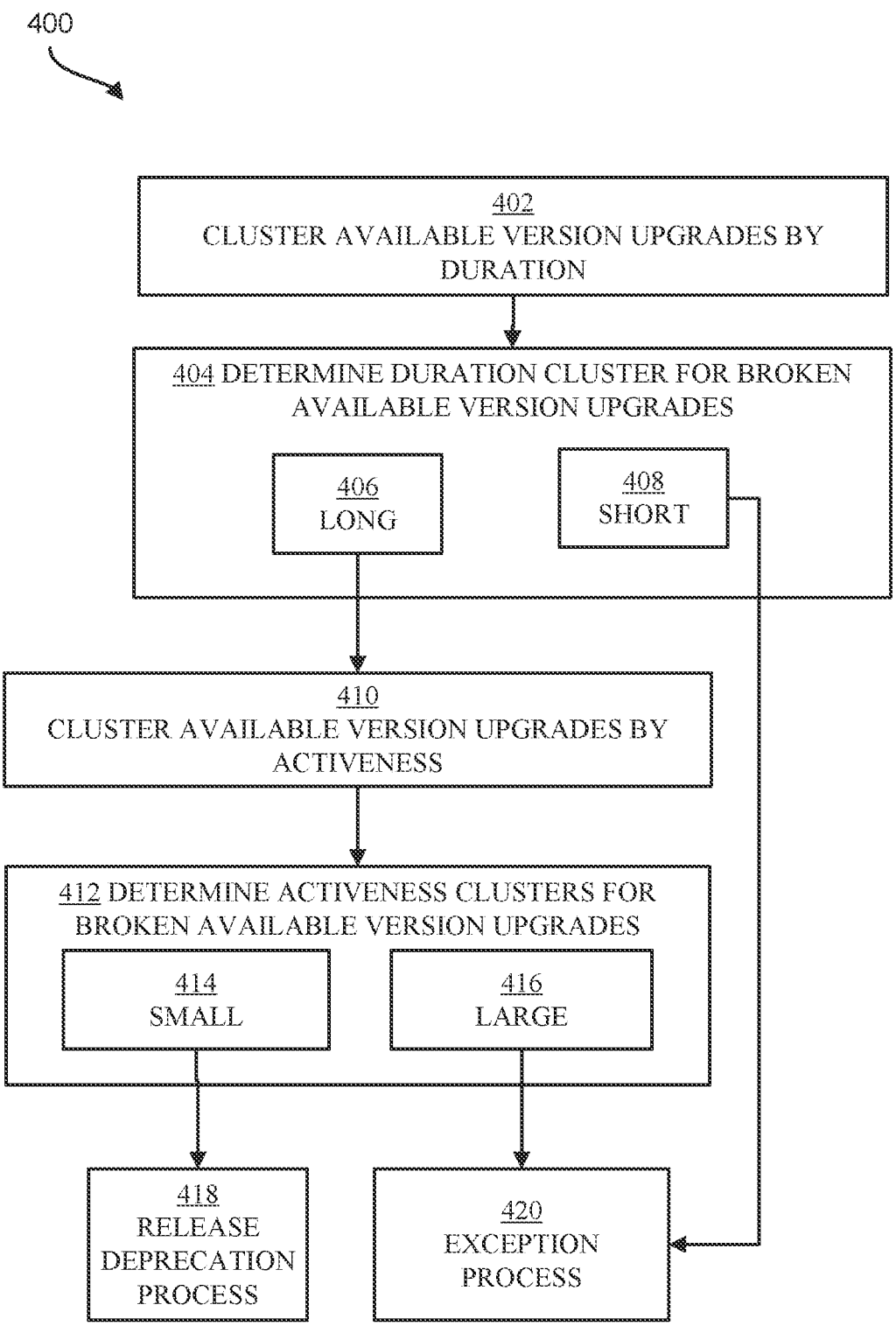
FIG. 4 illustrates a flowchart of an example method for generating custom recommendations for security-related library version upgrades with incompatibilities, in accordance with some embodiments of the present disclosure.

FIG. 4 illustrates a flowchart of a method 400 for generating custom recommendations for security-related library version upgrades with incompatibilities, in accordance with some embodiments of the present disclosure. The method 400 can be implemented by a data processing system (e.g., data processing system 102 or remote data processing system 122 of FIG. 1), a computer, a processor, and/or another configuration of hardware and/or software. In some embodiments, the method 400 implements a broken compatibility model 114. In some embodiments, the method 400 is a sub-method of operation 214 of FIG. 2.

Operation 402 includes clustering available version upgrades with backward incompatibilities (e.g., BROKEN?=Y) by duration. In some embodiments, operation 402 utilizes two clusters. However, in other embodiments, other numbers of clusters can be utilized. Any number of clustering techniques, now known or later developed, can be utilized. Example clustering techniques include, but are not limited to, hierarchical clustering, centroid (e.g., k-means) clustering, statistical distribution clustering, co-clustering (e.g., two-mode-clustering), clustering based on principal component analysis (PCA) or Independent Component Analysis (ICA), hard clustering, soft clustering (e.g., fuzzy clustering), and the like. Regardless of the clustering technique used, any number of rules can be applied to the clustering technique such as strict partitioning clustering, strict partitioning clustering with outliers, overlapping clustering, and the like.

Operation 404 includes determining the duration cluster for one or more available version upgrades that would cause broken compatibility. If the duration cluster is short 408, then the method 400 proceeds to operation 420 and implements an exception process. The exception process can include, for example, not upgrading an ML library to an available version and accepting the security risks associated with the non-upgraded version. If the duration cluster is long 406, then the method 400 proceeds to operation 410.

Operation 410 includes clustering available version upgrades with broken compatibility by activeness. In some embodiment, operation 410 generates two clusters. However, any number of clusters can be used in other embodiments. Operation 410 can use any of the clustering techniques described above with respect to operation 402.

Operation 412 includes determining the activeness cluster for one or more available version upgrades that would cause broken compatibility. If the activeness cluster is small 414, then the method 400 proceeds to operation 418 and performs a release deprecation process. The release deprecation process can involve upgrading the ML library to the newer version and rebuilding one or more associated ML models to be compatible with the upgraded version. If the activeness cluster is large 416, then the method 400 proceeds to operation 420 and performs the exception process as previously described.

Overall, the method 400 can illustrate a multi-level clustering model, where the first level is based on duration and the second level is based on activeness. As show in FIG. 4, the exception process can be implemented for version upgrades with (i) short duration; or (ii) long duration and large activeness. The release deprecation process can be implemented for version upgrades with long duration and small activeness.

Figure 5:
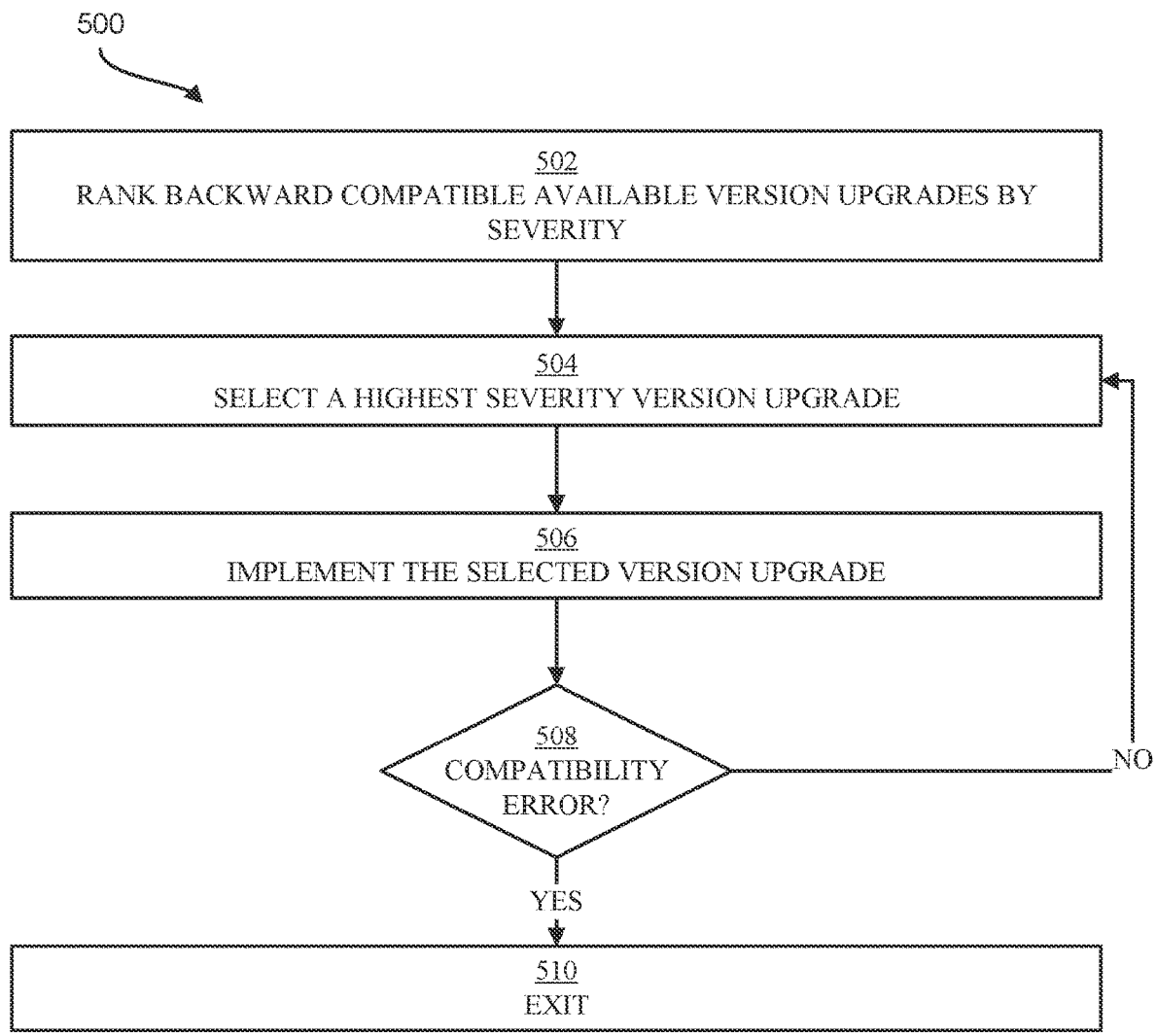
FIG. 5 illustrates a flowchart of an example method for implementing security-related library version upgrades without any incompatibilities, in accordance with some embodiments of the present disclosure.

FIG. 5 illustrates a flowchart of an example method for implementing security-related library version upgrades without any incompatibilities, in accordance with some embodiments of the present disclosure. The method 500 can be implemented by a data processing system (e.g., data processing system 102 or remote data processing system 122 of FIG. 1), a computer, a processor, and/or another configuration of hardware and/or software. In some embodiments, the method 500 is a sub-method of operations 208-210 of FIG. 2.

Operation 502 includes ranking backward compatible available version upgrades by severity (e.g., the severity of any security-related update associated with the available version upgrade). Operation 504 includes selecting a highest severity version upgrade. Operation 506 includes implementing the selected available version upgrade. Operation 508 determines if there was any compatibility error as a result of implementing the available version upgrade (e.g., any compatibility error that was otherwise unforeseen). If not (508: NO), then the method 500 returns to operation 504 and selects a next highest severity version upgrade. If so (508: YES), then the method 500 proceeds to operation 510 and exits the method 500 pending administrator review of the compatibility error.

Figure 6:
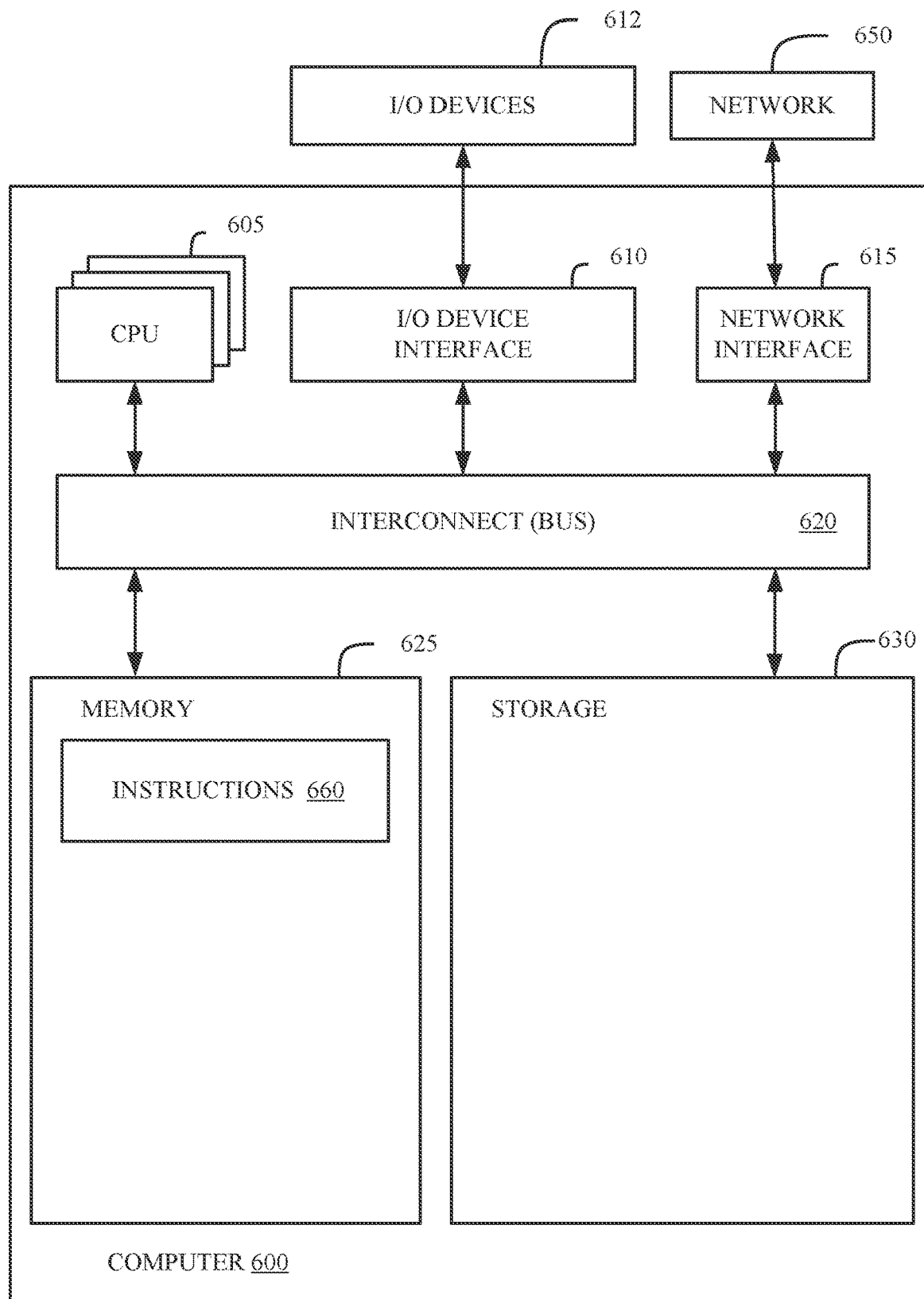
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all portions of the methods described in FIGS. 2 and/or 4-5 and/or implement the functionality discussed in FIGS. 1 and/or 3A-3C. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine (e.g., data processing system 102 of FIG. 1) such that the client machine executes the method, or a portion of the method, based on the instructions provided by computer 600. In some embodiments, the computer 600 is incorporated into (or functionality similar to computer 600 is virtually provisioned to) one or more entities illustrated in FIG. 1 and/or other aspects of the present disclosure.

Computer 600 includes memory 625, storage 630, interconnect 620 (e.g., a bus), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more buses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods of FIGS. 2 and/or 4-5 and/or implement the functionality discussed in FIGS. 1 and/or 3A-3C. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
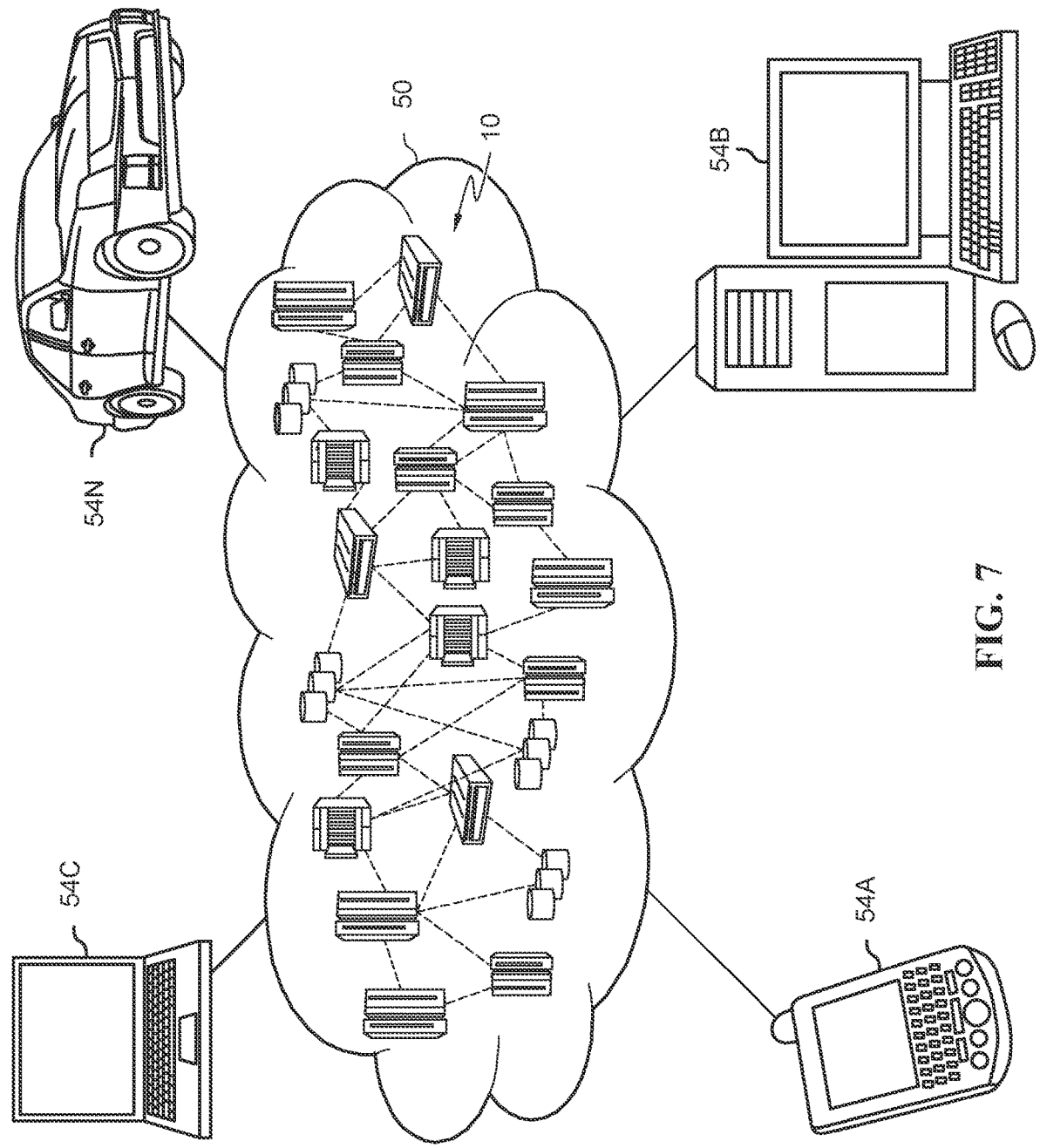
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
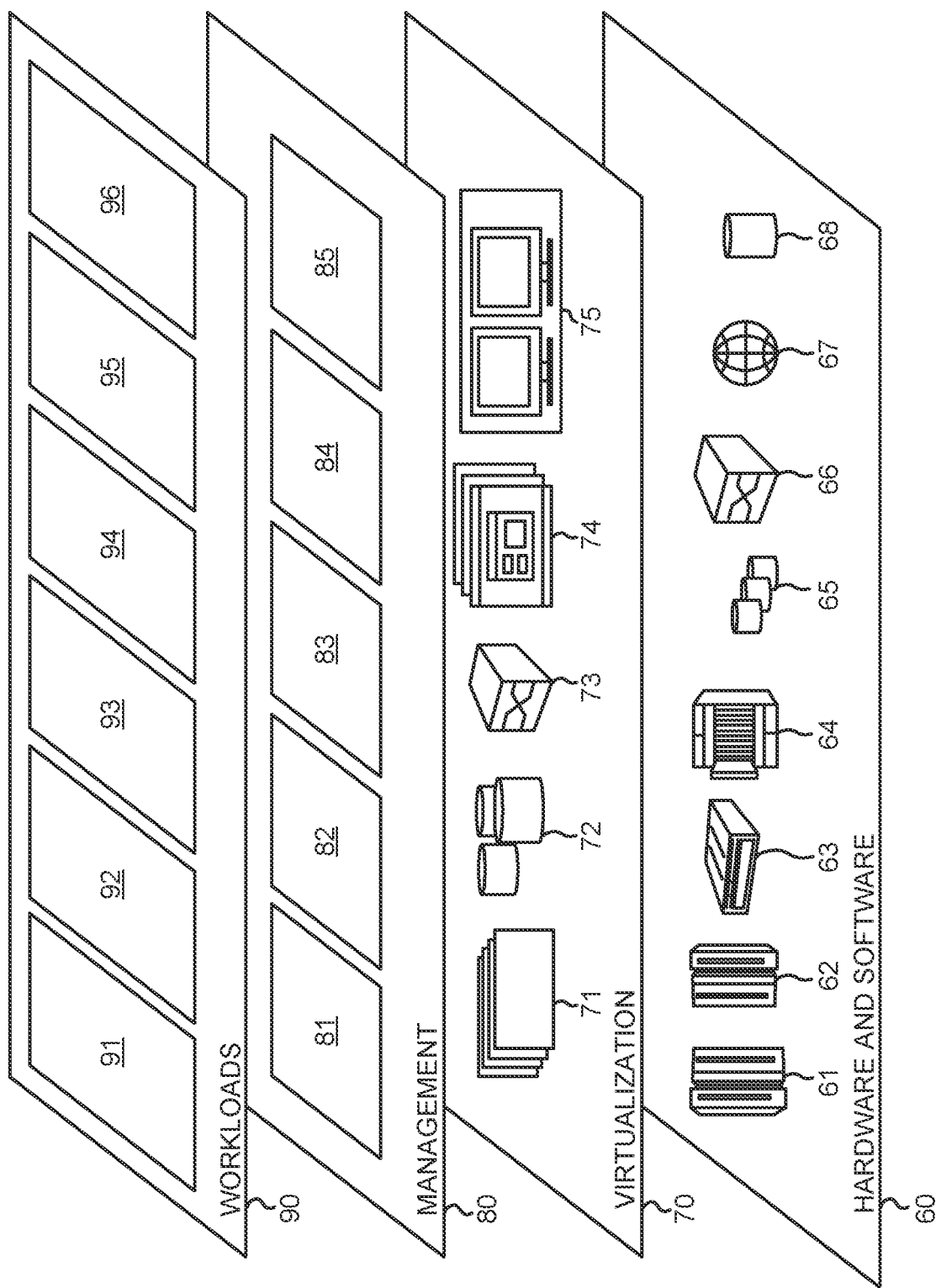
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated ML library version management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods described with respect to FIGS. 2 and/or 4-5 and/or implement the functionality discussed in FIGS. 1 and/or 3A-3C can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes generating a table comprising: a plurality of machine learning libraries and their current versions that are used in a deployed machine learning platform (MLP) instance; a first available version upgrade for a first machine learning library of the plurality of machine learning libraries: a security indication associated with the first available version upgrade relative to a current version implemented by the first machine learning library; and a compatibility indication between the first available version upgrade and the current version of the first machine learning library; and generating a recommendation related to upgrading the first machine learning library based on the security indication and the compatibility indication.

Example 2 includes the feature of Example 1, including or excluding optional features. In this example, the compatibility indication between the first available version upgrade and the current version of the first machine learning library is that the first available version upgrade is backward compatible with the current version, and wherein the recommendation indicates to upgrade the first machine learning library from the current version to the first available version upgrade. Optionally, the method further comprises: upgrading the first machine learning library from the current version to the first available version upgrade, and wherein the upgrading occurs in a sequence based on the security indication.

Example 3 includes the features of Example 1, including or excluding optional features. In this example, the compatibility indication between the first available version upgrade and the current version of the first machine learning library is that the first available version upgrade is not backward compatible with the current version, and wherein the method further comprises: inputting information from the modified table to a multi-level clustering model; and wherein the recommendation is based on output from the multi-level clustering model. Optionally, the multi-level clustering model is a two-level clustering model, wherein a first level is based on duration, and wherein a second level is based on activeness.

Example 4 includes the features of Example 3, including or excluding optional features. In this example, the recommendation indicates to proceed with a deprecation process for one selected from a group comprising: the first available version upgrade is associated with a short duration cluster in the multi-level clustering model; and the first available version upgrade is associated with a long duration cluster and a large activeness cluster in the multi-level clustering model; and wherein the method further comprises implementing the deprecation process for the first available version upgrade and the first machine learning library in the deployed MLP instance.

Example 5 includes the features of Example 3 including or excluding optional features. In this example, the recommendation indicates to proceed with an exception process when the first available version upgrade is associated with a long duration cluster and a small activeness cluster in the multi-level clustering model; and wherein the method further comprises implementing the exception process for the first available version upgrade and the first machine learning library in the deployed MLP instance.

Example 6 includes the features of any one of Examples 1 to 5, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 7 is a system. The system includes one or more computer readable storage media storing program instructions; and one or more processors which, in response to executing the program instructions, are configured to perform a method according to any one of Examples 1 to 6, including or excluding optional features.

Example 8 is a computer program product. The computer program product includes one or more computer readable storage media, and program instructions collectively stored on the one or more computer readable storage media, the program instructions comprising instructions configured to cause one or more processors to perform a method according to any one of Examples 1 to 6, including or excluding optional features.

What is claimed is:

1. A computer-implemented method comprising:
    generating a table comprising:
        a plurality of machine learning libraries and their current versions that are used in a deployed machine learning platform (MLP) instance;
        a first available version upgrade for a first machine learning library of the plurality of machine learning libraries:
        a security indication associated with the first available version upgrade relative to a current version implemented by the first machine learning library; and
        a compatibility indication between the first available version upgrade and the current version of the first machine learning library; and
    generating a recommendation related to upgrading the first machine learning library based on the security indication and the compatibility indication.

2. The method of claim 1, wherein the compatibility indication between the first available version upgrade and the current version of the first machine learning library is that the first available version upgrade is backward compatible with the current version, and wherein the recommendation indicates to upgrade the first machine learning library from the current version to the first available version upgrade.

3. The method of claim 2, wherein the method further comprises:
    upgrading the first machine learning library from the current version to the first available version upgrade, and wherein the upgrading occurs in a sequence based on the security indication.

4. The method of claim 1, wherein the compatibility indication between the first available version upgrade and the current version of the first machine learning library is that the first available version upgrade is not backward compatible with the current version, and wherein the method further comprises:
    inputting information from the table to a multi-level clustering model; and
    wherein the recommendation is based on output from the multi-level clustering model.

5. The method of claim 4, wherein the multi-level clustering model is a two-level clustering model, wherein a first level is based on duration, and wherein a second level is based on activeness.

6. The method of claim 5, wherein the recommendation indicates to proceed with a deprecation process for one selected from a group consisting of:
    the first available version upgrade is associated with a short duration cluster in the multi-level clustering model; and
    the first available version upgrade is associated with a long duration cluster and a large activeness cluster in the multi-level clustering model; and wherein the method further comprises implementing the deprecation process for the first available version upgrade and the first machine learning library in the deployed MLP instance.

7. The method of claim 5, wherein the recommendation indicates to proceed with an exception process when the first available version upgrade is associated with a long duration cluster and a small activeness cluster in the multi-level clustering model; and
    wherein the method further comprises implementing the exception process for the first available version upgrade and the first machine learning library in the deployed MLP instance.

8. The method of claim 1, wherein the method is performed by one or more computers according to software that is downloaded to the one or more computers from a remote data processing system, and wherein the method further comprises:
    metering a usage of the software; and
    generating an invoice based on metering the usage.

9. A system comprising:
    one or more computer readable storage media storing program instructions; and
    one or more processors which, in response to executing the program instructions, are configured to perform a method comprising:
    generating a table comprising:
        a plurality of machine learning libraries and their current versions that are used in a deployed machine learning platform (MLP) instance;
        a first available version upgrade for a first machine learning library of the plurality of machine learning libraries:
        a security indication associated with the first available version upgrade relative to a current version implemented by the first machine learning library; and
        a compatibility indication between the first available version upgrade and the current version of the first machine learning library; and
    generating a recommendation related to upgrading the first machine learning library based on the security indication and the compatibility indication.

10. The system of claim 9, wherein the compatibility indication between the first available version upgrade and the current version of the first machine learning library is that the first available version upgrade is backward compatible with the current version, and wherein the recommendation indicates to upgrade the first machine learning library from the current version to the first available version upgrade.

11. The system of claim 10, wherein the method further comprises:
    upgrading the first machine learning library from the current version to the first available version upgrade, and wherein the upgrading occurs in a sequence based on the security indication.

12. The system of claim 9, wherein the compatibility indication between the first available version upgrade and the current version of the first machine learning library is that the first available version upgrade is not backward compatible with the current version, and wherein the method further comprises:
    inputting information from the table to a multi-level clustering model; and
    wherein the recommendation is based on output from the multi-level clustering model.

13. The system of claim 12, wherein the multi-level clustering model is a two-level clustering model, wherein a first level is based on duration, and wherein a second level is based on activeness.

14. The system of claim 13, wherein the recommendation indicates to proceed with a deprecation process for one selected from a group consisting of:
- the first available version upgrade is associated with a short duration cluster in the multi-level clustering model; and
- the first available version upgrade is associated with a long duration cluster and a large activeness cluster in the multi-level clustering model; and
- wherein the method further comprises implementing the deprecation process for the first available version upgrade and the first machine learning library in the deployed MLP instance.

15. The system of claim 13, wherein the recommendation indicates to proceed with an exception process when the first available version upgrade is associated with a long duration cluster and a small activeness cluster in the multi-level clustering model; and
- wherein the method further comprises implementing the exception process for the first available version upgrade and the first machine learning library in the deployed MLP instance.

16. A computer program product comprising one or more computer readable storage media, and program instructions collectively stored on the one or more computer readable storage media, the program instructions comprising instructions configured to cause one or more processors to perform a method comprising:
- generating a table comprising:
  - a plurality of machine learning libraries and their current versions that are used in a deployed machine learning platform (MLP) instance;
  - a first available version upgrade for a first machine learning library of the plurality of machine learning libraries:
  - a security indication associated with the first available version upgrade relative to a current version implemented by the first machine learning library; and
  - a compatibility indication between the first available version upgrade and the current version of the first machine learning library; and
- generating a recommendation related to upgrading the first machine learning library based on the security indication and the compatibility indication.

17. The computer program product of claim 16, wherein the compatibility indication between the first available version upgrade and the current version of the first machine learning library is that the first available version upgrade is not backward compatible with the current version, and wherein the method further comprises:
- inputting information from the table to a multi-level clustering model; and
- wherein the recommendation is based on output from the multi-level clustering model.

18. The computer program product of claim 17, wherein the multi-level clustering model is a two-level clustering model, wherein a first level is based on duration, and wherein a second level is based on activeness.

19. The computer program product of claim 18, wherein the recommendation indicates to proceed with a deprecation process for one selected from a group consisting of:
- the first available version upgrade is associated with a short duration cluster in the multi-level clustering model; and
- the first available version upgrade is associated with a long duration cluster and a large activeness cluster in the multi-level clustering model; and
- wherein the method further comprises implementing the deprecation process for the first available version upgrade and the first machine learning library in the deployed MLP instance.

20. The computer program product of claim 18, wherein the recommendation indicates to proceed with an exception process when the first available version upgrade is associated with a long duration cluster and a small activeness cluster in the multi-level clustering model; and
- wherein the method further comprises implementing the exception process for the first available version upgrade and the first machine learning library in the deployed MLP instance.

\* \* \* \* \*